(12) United States Patent
Blank et al.

(10) Patent No.: US 11,761,338 B2
(45) Date of Patent: Sep. 19, 2023

(54) METHOD FOR PRODUCING A VIBRATION-DAMPING STRUCTURE COMBINATION FOR DAMPING VIBRATIONS OF MOVABLE MASSES

(71) Applicant: Siemens Energy Global GmbH & Co. KG, Munich (DE)

(72) Inventors: Robin Blank, Berlin (DE); Lena Farahbod-Sternahl, Hannover (DE); Christoph Kiener, Munich (DE); Sascha Martin Kyeck, Berlin (DE); Yves Küsters, Berlin (DE); Simon Purschke, Berlin (DE); Helge Reymann, Berlin (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 703 days.

(21) Appl. No.: 16/611,006

(22) PCT Filed: May 18, 2018

(86) PCT No.: PCT/EP2018/063041
§ 371 (c)(1),
(2) Date: Nov. 5, 2019

(87) PCT Pub. No.: WO2018/215323
PCT Pub. Date: Nov. 29, 2018

(65) Prior Publication Data
US 2020/0080611 A1    Mar. 12, 2020

(30) Foreign Application Priority Data
May 22, 2017   (DE) .................. 10 2017 208 631.9

(51) Int. Cl.
*F01D 5/16* (2006.01)
*B33Y 80/00* (2015.01)
(Continued)

(52) U.S. Cl.
CPC ............... *F01D 5/16* (2013.01); *B22D 19/00* (2013.01); *B33Y 80/00* (2014.12); *F01D 5/18* (2013.01);
(Continued)

(58) Field of Classification Search
CPC ... F01D 5/26; F01D 25/06; F01D 5/16; F01D 5/10; F01D 25/04; F04D 29/668; F16F 7/10
See application file for complete search history.

(56) References Cited

U.S. PATENT DOCUMENTS 7,837,439 B2 * 11/2010 Bech ................. F03D 1/0675
                                                    416/62
8,544,597 B1   10/2013 McEnerney
(Continued)

FOREIGN PATENT DOCUMENTS

DE   102010003594 A1   10/2011
DE   102010052965 A1   5/2012
(Continued)

OTHER PUBLICATIONS

English translation of International Preliminary Report on Patentability Chapter I (Year: 2019).*
(Continued)

*Primary Examiner* — Igor Kershteyn
*Assistant Examiner* — Wesley Le Fisher (57) ABSTRACT

A method for producing a vibration-damping structure combination for damping vibrations for movable masses, having a first structure and a further structure, the further structure movable within a stop surface defined by a first structure surface of the first structure. The method includes a) providing the first structure, having the first structure surface and which defines a coating surface of a coating at least in some sections; b) coating the first structure surface of the
(Continued)

first structure with the coating, the coating surface of the coating being applied such that a cavity is formed; c) filling the cavity with the filler; d) curing the filler until the further structure having a further structure surface is formed, which lies against the coating surface; and e) removing the coating, the further structure thus being movable relative to the first structure within the stop surface defined by the first structure surface.

12 Claims, 3 Drawing Sheets

(51) Int. Cl.
    *B22D 19/00* (2006.01)
    *F01D 5/18* (2006.01)
    *F01D 25/06* (2006.01)
    *F16F 7/10* (2006.01)
    *B23P 15/04* (2006.01)

(52) U.S. Cl.
    CPC .............. *F01D 25/06* (2013.01); *F16F 7/10* (2013.01); *B23P 15/04* (2013.01); *F05D 2220/30* (2013.01); *F05D 2240/24* (2013.01); *F05D 2260/96* (2013.01)

(56) References Cited

U.S. PATENT DOCUMENTS

| | | | |
|---|---|---|---|
| 9,470,095 B2 * | 10/2016 | Propheter-Hinckley | F01D 5/16 |
| 9,903,434 B2 * | 2/2018 | Erno | B22F 5/04 |
| 10,036,258 B2 * | 7/2018 | Mongillo | F01D 25/24 |
| 10,041,359 B2 * | 8/2018 | Brandl | F01D 5/147 |
| 10,247,005 B2 * | 4/2019 | Hartung | F04D 29/083 |
| 10,400,625 B2 * | 9/2019 | Cortequisse | F01D 25/06 |
| 10,570,752 B2 * | 2/2020 | Roesele | F04D 29/668 |
| 10,987,733 B2 * | 4/2021 | Erno | B22F 10/66 |
| 2013/0195611 A1 | 8/2013 | Retze | |
| 2013/0276461 A1 | 10/2013 | Propheter-Hinckley et al. | |
| 2013/0287583 A1 | 10/2013 | Schoenhoff et al. | |
| 2013/0294891 A1 * | 11/2013 | Neuhaeusler | F01D 5/147 29/889.7 |
| 2015/0052898 A1 * | 2/2015 | Erno | F16F 9/10 60/726 |
| 2015/0202717 A1 | 7/2015 | Bruck et al. | |
| 2015/0345298 A1 | 12/2015 | Mongillo et al. | |
| 2015/0345304 A1 | 12/2015 | Mongillo et al. | |
| 2015/0345396 A1 | 12/2015 | Zelesky et al. | |
| 2016/0115822 A1 | 4/2016 | Cortequisse | |
| 2016/0138401 A1 * | 5/2016 | Hartung | F04D 29/083 416/220 R |
| 2018/0334909 A1 | 11/2018 | Mongillo et al. | |

FOREIGN PATENT DOCUMENTS

| | | | | |
|---|---|---|---|---|
| DE | 102012201048 A1 | 7/2013 | | |
| DE | 112015000461 T5 | 11/2016 | | |
| DE | 102015226653 A1 | 6/2017 | | |
| EP | 2724799 A1 | 4/2014 | | |
| EP | 3015647 A1 | 5/2016 | | |
| GB | 2529641 A | * | 3/2016 | F01D 5/147 |
| JP | 6362931 B2 | 7/2018 | | |
| WO | 2014105108 A1 | 7/2014 | | |

OTHER PUBLICATIONS

PCT search report and search opinion (Year: 2018).*
PCT International Search Report and Written Opinion of International Searching Authority dated Jun. 9, 2018 corresponding PCT International Application No. PCT/EP2018/063041 filed May 18, 2018.

* cited by examiner

METHOD FOR PRODUCING A VIBRATION-DAMPING STRUCTURE COMBINATION FOR DAMPING VIBRATIONS OF MOVABLE MASSES

CROSS REFERENCE TO RELATED APPLICATIONS

This application is the US National Stage of International Application No. PCT/EP2018/063041 filed 18 May 2018, and claims the benefit thereof. The International Application claims the benefit of German Application No. DE 10 2017 208 631.9 filed 22 May 2017. All of the applications are incorporated by reference herein in their entirety.

FIELD OF INVENTION

The invention relates to a method for producing a vibration-damping structure combination, to an intermediate product of the method for producing the vibration-damping structure combination, and to a structure combination for damping vibrations of movable masses.

BACKGROUND OF INVENTION

A rotating turbomachine, a turbine for example for example for a power plant, comprises a rotor having a plurality of rotor blades and a stator having a plurality of guide vanes. During operation of the turbine, the rotor moves about a rotation axis with a particular rotational speed so that the rotor blades arranged on the rotor also move about the rotation axis of the rotor with the particular rotational speed. The rotational speed of the motor may change during operation, so that a positive or negative rotational acceleration of the rotor and of the rotor blades may occur because of the change in the rotational speed. The positive or negative rotational accelerations of the rotor blades may cause vibrations of the rotor blades. Because operating parameters of the rotor blades may also change because of changes in the operation of the turbine, vibrations may also occur in the guide vanes. The vibratable sections of the guide vanes or rotor blades may be regarded as movable masses. The vibrations of the rotor blades and/or of the guide vanes may cause crack formation in the respective rotor blades and/or the guide vanes, or an existing crack formation process in the respective rotor blades and the guide vanes may be amplified. The cracks may lead during operation of the turbine to detachment of parts of the rotor blades, of the guide vanes and/or one of the rotor blades from the rotor and/or one of the guide vanes from the stator, so that the rotor, the other rotor blades, the stator or the other guide vanes may be damaged.

In order to prevent damage to the rotor, the other rotor blades, the stator or the other guide vanes, the rotor blades and the guide vanes are replaced after a particular operating time in a maintenance process. The predetermined operating time, after the end of which the rotor blades or the guide vanes are changed, is dependent on the respective rotor blades or guide vanes. The rotor blades or the guide vanes therefore have a relatively short lifetime.

SUMMARY OF INVENTION

It is therefore an object of the invention to provide a method for producing a vibration-damping structure combination for damping vibrations of movable masses, to an intermediate product of the method for producing a vibration-damping structure combination, and to a structure combination for damping vibrations of movable masses.

The object is achieved by the features of the independent claims. Preferred embodiments thereof are specified in the dependent claims.

The method according to the invention for producing a vibration-damping structure combination for damping vibrations for movable masses, having a first structure and a further structure, the further structure being movable within an abutment surface defined by a first structure surface of the first structure, comprises the following steps: a) providing the first structure, which comprises the first structure surface and at least in sections determines a coating surface of a coating; b) coating the first structure surface of the first structure with the coating, the coating surface of the coating being applied so as to form at least one cavity; c) filling the cavity with a filler; d) curing the filler until the further structure having a further structure surface, which bears on the coating surface is formed; and e) removing the coating so that the further structure is movable relative to the first structure within the abutment surface defined by the first structure surface.

The abutment surface may be a bounding surface, within which the further structure can move relative to the first structure.

Because the further structure is movable within the abutment surface defined by the first structure surface, vibrations, which are for example initiated by positive or negative accelerations of the moved first structure, can be damped by means of a compensating movement and/or by means of abutment of the further structure surface of the further structure on the abutment surface of the first structure. Because the vibration of the first structure can be damped by means of the compensating movement or by means of the abutment, crack formation or crack enlargement due to the vibrations can be counteracted. The invention thus selects a different approach. While only symptoms of the problem are dealt with in the maintenance process, the actual cause of the problem, the occurrence of vibrations in the rotor blades and the guide vanes, remains unaddressed. By means of the invention, conversely, vibrations are damped and the lifetime of the guide vanes or the rotor blades is thus increased.

For example, it is conceivable for a rotor blade, moving about a rotation axis, of a turbine to be constructed from the vibration-damping structure combination. By virtue of the fact that the rotor blade is constructed from the vibration-damping structure combination, the vibrations occurring during operation can be damped, so that the crack formation or the crack enlargement is inhibited and/or reduced. By virtue of the fact that the crack formation or the crack enlargement is inhibited and/or reduced, the lifetime of the rotor blade of the turbine is increased. Construction of a guide vane of the turbine or of another vibration-sensitive component of a turbine from the vibration-damping structure combination is likewise conceivable.

Besides a rotation, a movement responsible for the vibration may also for example be a linear movement, a tilting movement, a movement along a curve, an accelerated movement of any other form of movement.

The coating, as described in method step b), of the first structure surface may for example be carried out by means of electroplating or chemical vapor deposition, for example CVD. Other coating methods may likewise be used. The first structure surface is coated in such a way that, during the filling of the cavity with the filler, the filler cannot establish any unintended contact with the first structure. It may, however, be advantageous for the first structure to be in contact with the cured filler, the further structure, in order to allow advantageous transport, advantageous handling or advantageous assembly of the structure combination. After the transport, handling or assembly, the connection between the first structure and the further structure may be released, for example by means of single application or by means of single heating, so that the further structure is movable relative to the first structure within the abutment surface defined by the first structure surface.

The filler described in method step c) may, for example, be a metal melt or a slurry. The fillers used should be selected with the aid of the desired requirements and/or with the aid of the first structure material used. The curing of the filler may, for example, be carried out without active intervention in the curing process by a longer period of time, or by active intervention in the curing process by means of active cooling and/or active heating of the structure combination.

The removal of the coating may, for example, be carried out by means of an etching process or by means of another chemical or physical process. A further possibility for removing the coating is to heat the structure combination with the coating above a melting point or an evaporation point of the coating, so that the coating loses its solid form and can be taken away. For example, the removal may also be carried out during operation of the structure combination, so that the further structure is better protected during transport, handling and assembly. Removal of the coating during operation must, however, be carried out in such a way that the further structure is movable relative to the first structure within the abutment surface defined by the first structure surface.

The intermediate product according to the invention for the production of a vibration-damping structure combination comprises a first structure, which comprises a first structure surface that bears at least in sections on a coating surface of a coating, and a further structure which comprises a further structure surface and is formed from a cavity filled with a curable filler, the further structure surface bearing at least in sections on the coating surface of the coating, the coating being removable in order to make the further structure movable within an abutment surface defined by the first structure surface. The intermediate product is a product of the method which has been carried out as far as step d), curing the filler. The intermediate product comprises the coating, so that the further structure bears at least in sections on the coating surface of the coating. Because the further structure bears at least in sections on the coating surface of the coating, relative movement of the further structure with respect to the first structure is prevented. The intermediate product can therefore be advantageously transported, handled and assembled. If the coating is subsequently removed, the further structure is movable within the abutment surface defined by the first structure surface, so that vibrations of the first structure can be damped by means of a compensating movement of the further structure and/or by means of abutment of the further structure on the abutment surface of the first structure. The removal of the coating may for example be carried out after transport, handling or after assembly. For example, it is conceivable for the coating to be removable by means of etching or by means of heating. It may, for example, be possible to carry out the heating in such a way that the melting point of the coating material and/or the evaporation point of the coating material is exceeded, so that the liquid or gaseous coating may be taken away, for example through a small opening. The heating may, for example, also take place in a first operating phase during operation of the moved masses, so that the further structure is not movable relative to the first structure until during operation. By virtue of the fact that the further structure is not movable relative to the first structure until during operation, assembly may be carried out particularly advantageously.

For example, the liquid or gaseous coating may remain in the cavity during the entire lifetime of the structure combination and function during operation as a damping medium between the further structure and the first structure. If the operating temperature of the moved masses is for example above the melting point of the coating or above the evaporation point of the coating, it is conceivable for the coating to be in solid form outside operation, for example in order to be able to carry out maintenance processes advantageously, and for the coating to be in liquid or gaseous form during operation, in order to function as a damping medium between the first structure and the further structure during operation.

For example, another damping medium, for example an oil or an inorganic liquid, may also be introduced between the first structure and the further structure after removal of the coating, in order to damp a movement of the further structure relative to the first structure until the further structure abuts on the first structure surface.

The structure combination according to the invention for damping vibrations of movable masses comprises a first movable structure, which has a particular first inertia and has a first structure surface that is configured as an abutment surface, and comprises a jointly movable further structure which is formed from a cavity filled with a curable filler, the further structure having a particular further inertia and comprising a further structure surface, and the further structure being mobile relative to the first structure within the abutment surface defined by the first structure surface, so that vibrations which may be initiated by positive and/or negative accelerations of the movable masses can be damped by means of a compensating movement due to the further inertia of the further structure and/or by means of abutment of the further structure surface of the further structure on the abutment surface of the first structure. By virtue of the fact that the vibrations can be damped by means of the compensating movement and/or by means of abutment of the further structure on the abutment surface, crack formation and/or enlargement of an existing crack is counteracted. By virtue of the fact that the crack formation is counteracted, the lifetime of a component which comprises the structure combination at least in regions may be increased.

The compensating movement is a movement, directed counter to the positive or negative acceleration, of the further structure from a neutral position into a deflected position. Because of gravity or because of the centrifugal force during a rotational movement, the compensating movement is usually possible only by overcoming a static friction. The static friction is the force that prevents touching bodies from sliding and depends on material properties and surface conditions of the body. The material properties and the surface conditions of the first structure and of the further structure may be influenced in such a way that defined starting of the desired compensating movement is made possible. Once the compensating movement has been started, the compensating movement may be influenced with the aid of the friction of the first structure and further structure moving with respect to one another.

A further possibility for influencing the compensating movement is to configure the shape of the abutment surface of the first structure in such a way that a restoring force, which is responsible for restoring the further structure into the neutral position, increases with the deflection of the further structure from the neutral position. The greater deflection from the neutral position is, the greater is the restoring force which acts on the further structure. This may, for example, be made possible by means of a parabolic abutment surface on which the further structure moves. The shape of the abutment surface thereby influences the compensating movement. By virtue of the fact that the shape of the abutment surface influences the compensating movement, a suitable shape of the abutment surface may be selected according to requirements of the structure combination. An undulating or zigzag abutment surface may likewise be envisioned.

For example, the compensating movement may also be influenced by means of using spring elements and/or damping elements, so that a spring-damper system is formed. The spring elements and/or the damping elements may, for example, be fastened on the first structure and on the further structure, so that the deflection of the further structure from the neutral position and the restoral into the neutral position may be influenced. The behavior of the spring-damper system may be controlled with the aid of a spring constant and with the aid of a damping constant. By virtue of the fact that the behavior of the spring-damper system can be influenced, the suitable spring element with the suitable spring constant and/or the suitable damping element with the suitable damping constant may be selected according to the requirements of the structure combination.

Besides the compensating movement, the abutment of the further structure on the abutment surface may also damp the vibrations. By means of the bearing of the further structure, stopping of the compensating movement takes place. By the stopping of the compensating movement, a force occurring because of the inertia of the moved masses may further dampen the vibration of the first structure. The position of the abutment surface, which stops the compensating movement of the further structure, defines when the compensating movement is stopped and thereby counteracts the force, occurring because of the inertia of the moved masses, of the undesired vibration of the first structure. When the vibration of the first structure can be damped by means of the abutment on the abutment surface is therefore defined by the position of the abutment surface.

For example, an impact which occurs because of the abutment of the further structure of the abutment surface may be elastic or plastic. This may be influenced by means of the material properties of the first structure and of the further structure. If, for example, an elastic behavior of the impact is desired, during which no kinetic energy is converted into internal energy, for example heat or deformation, the material properties of the first structure and of the further structure should be selected accordingly. If a plastic impact is desired, the material properties are likewise to be selected accordingly.

Preferably, a lattice structure is at least partially provided as the first structure. The lattice structure may, for example, be constructed from a multiplicity of unit cells arranged next to one another. The unit cell is a particular geometrical shape, for example a cube or a cuboid, which has a particular number of unit cell interfaces depending on the shape. The unit cell comprises a solid region and a void region in its interior. The solid region is filled with filler material and the void region is free of filler material. The solid region and the void region are arranged in the unit cell in such a way that, when unit cells are arranged flat against one another, a connected solid structure and a connected void structure are formed. Typical shapes of the solid structure of one of the unit cells are, for example, star geometries or cross geometries.

The lattice structure may, for example, be produced by means of additive manufacturing methods. A particular method may be a selective laser melting method. The additive manufacturing methods make it possible to produce lattice structures from different materials, for example an aluminum alloy AlSi10Mg, a superalloy for high-temperature applications MP1-CoCrMo, a high-performance steel maraging steel MS1, stainless steels or plastics.

The first structure may, for example, also consist of a body whose outer shell is constructed from continuous material and whose internal structure is constructed from a lattice structure. The first structure may, for example, also comprise a plurality of lattice structures which are separated from one another, and/or a plurality of different lattice structures which are connected to one another.

The structure combination may also be constructed in such a way that more than one cavity is to be filled with the liquid filler after the coating. Because more than one cavity is to be filled with the liquid filler, a plurality of further structures are formed, which are respectively movable relative to the first structure after the removal of coating.

The coating of the lattice structure of the first structure must be carried out in such a way that the void regions of the unit cells are still connected to one another even after the coating, so that the connected cavity, which can be filled with the filler, is formed. Because the connected cavity can be arranged inside the lattice structure, the further structure which is formed from the cured filler is arranged undetachably from the first structure. After the coating has been removed, a relative movement of the further structure with respect to the first structure and/or abutment of the further structure on the first structure is made possible.

Preferably, the further structure can be separated from the first structure without a shape change and/or without structural modification. To this end, the shape of the first structure must be selected in such a way that the cavity which can be filled with the filler is formed by means of the coating surface and possible additional molded parts, and at the same time, after the curing of the filler and after the removal of the additional molded parts and the coating, a relative movement of the further structure with respect to the first structure and abutment of the further structure on the abutment surface of the first structure is made possible and the abutment surface of the first structure does not limit the movement of the further structure in all directions and/or all direction combinations, but allows free movement in at least one of the directions and/or one of the direction combinations, so that the further structure can be separated from the first structure. By virtue of the fact that the further structure can be separated from the first structure, for example, maintenance processes may be carried out straightforwardly.

Preferably, at least one region of the first structure is formed enclosed by the further structure, and/or at least one region of the further structure is formed enclosed by the first structure, so that the further structure is undetachable from the first structure. By virtue of the fact that at least one region of the further structure is formed enclosed by the first structure and/or at least one region of the first structure is formed enclosed by the further structure, the two structures are connected inseparably to one another and can move relative to one another in all directions and/or in all direction combinations within the abutment surface bounded by the first structure surface. Free movement, detachment of the first structure from the further structure, is however prevented. Because free movement in all directions and/or in all direction combinations is prevented, and instead only movement in all directions and/or in all direction combinations is made possible within the abutment surface, positive or negative accelerations in all directions and/or in all direction combinations may advantageously be damped by means of a compensating movement of the further structure and/or by means of abutment on the abutment surface.

If the first structure comprises one of the lattice structures, for example, the further structure, which is formed inside the first structure, will also have a further lattice structure. A structure combination is formed, which consists of two lattice structures interconnected with one another. The lattice structures are arranged undetachably from one another, but can move relative to one another within the abutment surface.

Preferably, the cavity is formed in sections with the coating surface and/or in sections with a surface of an additional molded part. By virtue of the fact that the cavity is formed with the coating surface and/or with the surface of an additional molded part, even freer configuration of the cavity is made possible. The molded parts make it possible to form a cavity which could not be formed merely by means of the coating surface. If the first structure has relatively large openings, for example, through which the liquid filler could emerge, it not being possible to close the relatively large openings by means of the coating, they may be closed by means of a filler body whose surface therefore defines the cavity in combination with the coating surface.

Preferred embodiments of a structure combination according to the invention and of a method according to the invention for producing a vibration-damping structure combination will be presented below with the aid of schematic drawings.

DETAILED DESCRIPTION OF INVENTION

Figure 1:
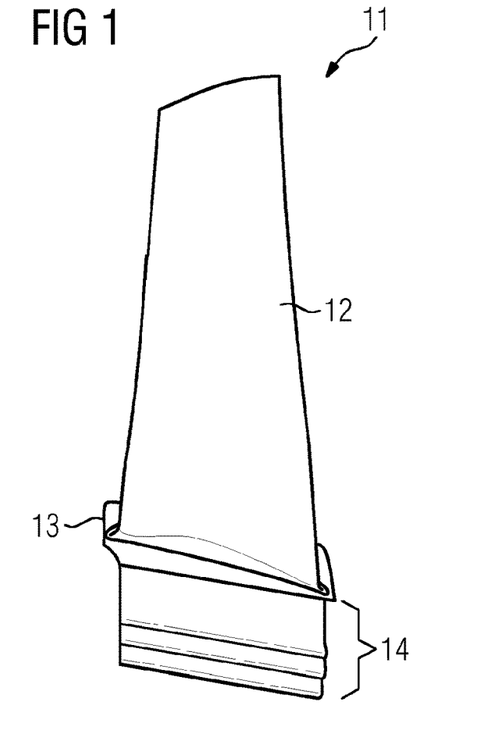
FIG. 1 shows a schematic representation of a turbine blade.
Figure 2:
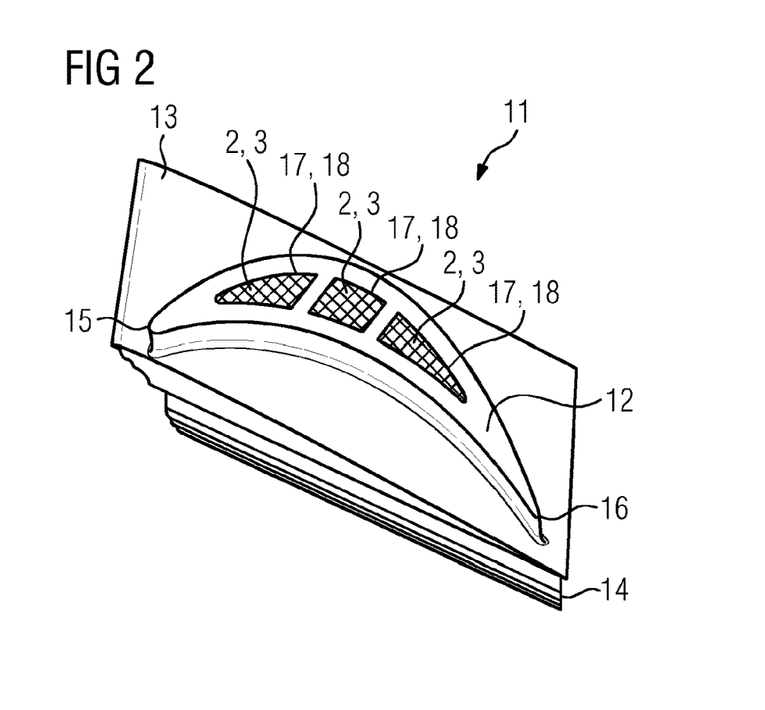
FIG. 2 shows a schematic representation of a cross section through the turbine blade shown in FIG. 1, which comprises an exemplary embodiment of a structure combination according to the invention.

Reference is first made to FIGS. 1 and 2.

FIGS. 1 and 2 show a turbine blade 11 of a rotating turbomachine.

The rotating turbomachine may be a turbine or a compressor, respectively having a rotor with a plurality of rotor blades and a stator with a plurality of guide vanes. The turbine blade 11 shown in FIGS. 1 and 2 is in the present exemplary embodiment configured as a rotor blade. In contrast to the present exemplary embodiment, the turbine blade 11 may also be configured as a guide vane.

In the present exemplary embodiment, the turbine blade 11 comprises a blade body 12, a platform 13 and a fastening section 14.

By means of the fastening section 14, the turbine blade 11 can be connected to the rotor. The fastening section 14 is bound by the platform 13, which separates the fastening section 14 from the blade body 12. The blade body 12 comprises a blade front edge 15, a blade rear edge 16 and blade cavities 17. The blade body 12 extends starting from the platform 13 as far as an end lying radially further outward or further inward. The blade body 12 is exposed to the flow of the turbine and moves, for example, about a turbine rotation axis of the turbine. In this case, a fluid flows from the blade front edge 15 along the blade body 12 as far as the blade rear edge 16. Different flow velocities may, for example, cause vibrations of the blade body 12. The vibrating sections 10 of the blade body 12 represent movable masses 10 in the present exemplary embodiment. These vibrations may cause crack formation or amplify an existing crack formation process. The cracks may damage the blade body 12, the turbine blade 11 and the entire turbine. Furthermore, the blade body 12 is exposed to a high thermal load during operation due to a high temperature of the fluid flowing around the blade body 12. In order to keep the thermal load of the blade body 12 in the permissible range, the blade body 12 comprises, for example, blade cavities 17 through which a cooling fluid for cooling the blade body 12 can flow. In FIG. 2, by way of example, three blade cavities 17 through which the cooling fluid can flow are represented.

In the present exemplary embodiment, the blade cavities 17 are used inter alia for cooling the blade body 12.

Vibrations of the turbine blade 11 which occur during operation may cause crack formation or amplify an existing crack formation process.

In order to counteract this, in the present exemplary embodiment a structure combination 18 for damping vibrations is provided in the blade cavity 17.

In the present exemplary embodiment, the structure combination 18 comprises a first structure 2 and a further structure 3, the further structure 3 being movable relative to the first structure 2 within the abutment surface defined by the first structure surface 5 of the first structure 2.

The abutment surface may be a bounding surface, within which the further structure 3 can move relative to the first structure 2. In this case, according to the present invention "abutment" or mechanical contact need not necessarily take place. According to one configuration, direct abutment or mechanical contact between the first structure 2 and the further structure 3 specifically does not occur.

In the present exemplary embodiment, the further structure 3 is interconnected with the first structure 2. In other words, the first structure 2 and the further structure 3 are undetachably connected to one another in the present exemplary embodiment. It is, however, also conceivable for the further structure 3 to be configured to be separable, i.e. detachable, from the first structure 2.

The vibrations which occur during operation of the turbine blade 11 are damped by the compensating movement and/or by the abutment of the further structure 3 on the abutment surface of the first structure 2. Furthermore, the thermal load occurring during operation may also be reduced by means of the flow of the cooling fluid through the blade cavities 17.

If the first structure 2 is for example a lattice structure and connected to the blade body 12 along the entire blade height, heat energy absorbed by the blade body surface is conducted into the lattice structure and absorbed there by the cooling fluid flowing past. The lattice structure increases the surface on which the heat transfer can take place, so that a greater amount of heat can be transported away, so that the temperature of the blade body 12 can be reduced. Furthermore, at the same time the vibrations of the turbine blade 11 which occur are damped by means of the further structure.

For example, the entire turbine blade 11 may be produced by means of additive manufacturing methods, the blade cavities 17 and/or additional jointly manufactured structures being used as a first structure 2 in the sense of the present invention.

For example, the blade cavities 17 are filled with a lattice structure which is subsequently coated together with the blade cavity 17, and thereby defines the cavity 8. Subsequently, the cavity 8 may be filled with the filler 9. The cured filler 9 forms the further structure 3 interconnected with the first structure 2. The removal of the coating 4 may subsequently be carried out, for example, by an etching process, so that the further structure 3 becomes movable relative to the first structure 2 and vibrations can therefore be damped.

Reference is now additionally made to FIGS. 3 to 9.

FIGS. 3 to 9 show method steps for the production of the vibration-damping structure combination 18 for damping vibrations of movable masses 10, which in the present exemplary embodiment are sections of the turbine blade 11.

The finished structure combination 18 comprises a base plate 1, the first structure 2 with the first structure surface 5, and the further structure 3 with the further structure surface 7. Bearing on the first structure surface 5—as explained in more detail below—in the course of the method there is temporarily a coating 4 with a coating surface 6. The coating surface 6 defines a cavity 8, which can be filled with a liquid filler 9, so that the further structure 3 can be formed.

Figure 3:
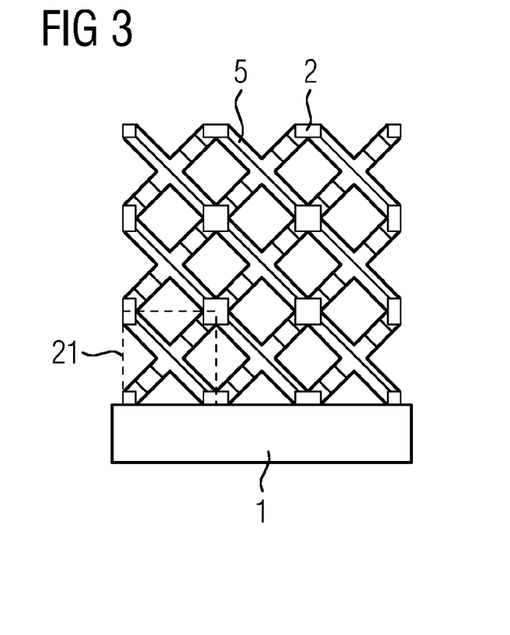
FIG. 3 shows a schematic representation of a starting point of an exemplary embodiment of a method for producing the structure combination.

FIG. 3 shows the starting point of the method. The first structure 2 represented has been produced, for example, by means of additive manufacturing methods on the base plate 1.

The base plate 1 and the first structure 2 are connected to one another, and the base plate 1 bounds the structure combination 18 one direction. The first structure 2 comprises, for example, a lattice network. The exemplary lattice structure is relatively simple and comparatively economical to produce by means of additive manufacturing.

In a first method step, a coating 4 is applied onto the first structure surface 5.

Figure 4:
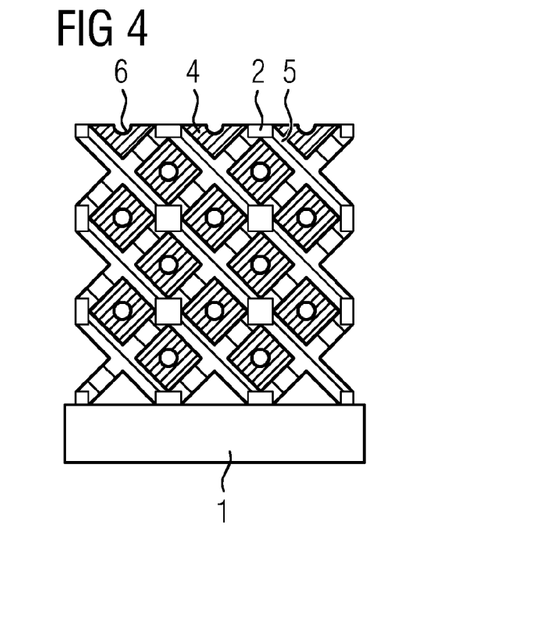
FIG. 4 shows a schematic representation of a further method step for the production of the structure combination.

The coating may for example carried out by means of chemical vapor deposition, for example CVD, or electroplating. The coating is carried out in such a way that the entire first structure surface 5 of the first structure 2 is wetted with the coating 4. Unintended uncoated sections of the first structure surface may lead to problems in the further course of the method.

FIG. 4 shows the first structure 2 after the coating process by which the coating 4 has been applied onto the first structure surface 5.

The coating 4 bears on the first structure surface 5.

FIG. 5 again shows the first structure 2 coated with coating 4, the coating surface 6 of the coating 4 defining the cavity 8.

Figure 5:
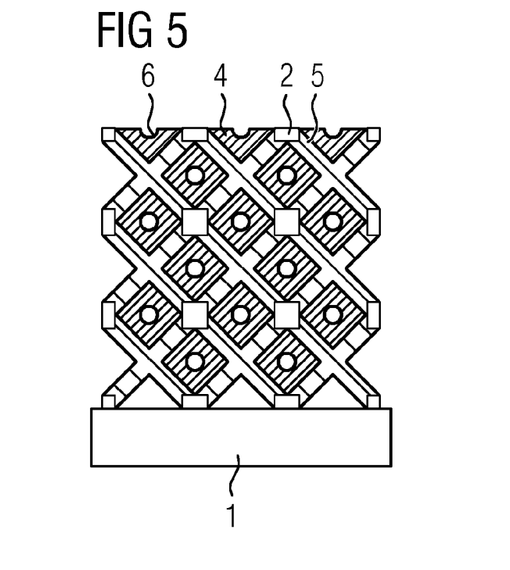
FIG. 5 again shows the method step represented in FIG. 4.

Besides the coating surface 6, additional surfaces of molded parts which are arranged on the coated first structure 2 may for example also define the cavity 8. The cavity 8 is configured in such a way that filling of the cavity 8 with the filler 9 is possible.

Filling of the cavity 8 with the filler 9 is then carried out in a further step.

Figure 6:
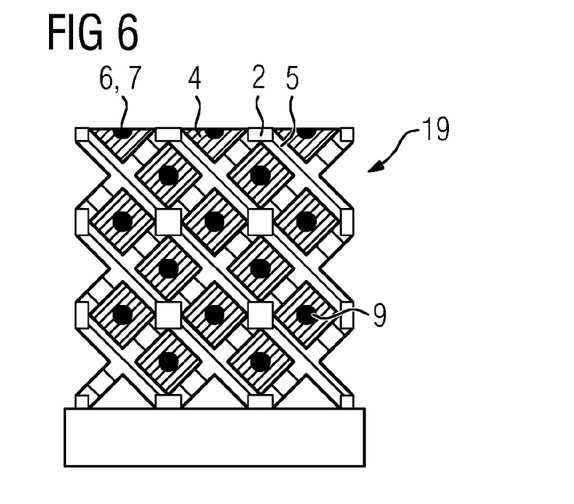
FIG. 6 shows a schematic representation of a further method step for the production of the structure combination.

FIG. 6 shows the first structure 2 with the coating 4 and the cavity 8 filled with the filler 9. The filler 9 fills the cavity 8 entirely, and thereby forms the further structure 3. Curing of the filler 9 may for example be carried out by means of cooling the filler 9, if the filler 9 is for example a metal, or by firing the filler 9, if the filler 9 is for example a slurry. The respective materials used for the first structure 3 and the further structure 3 should be selected according to desired properties of the first structure 2 and of the further structure 3. If, for example, it is desired for the further structure 3 to be electrically nonconductive, the further structure 3 should for example consist of a ceramic.

In other words, FIG. 6 shows an intermediate product 19 for the production of a vibration-damping structure combination 18. In this case, the intermediate product 19 in the present exemplary embodiment comprises the first structure 2 with the first structure surface 5, which bears at least in sections on a coating surface 6 of a coating 4. The further structure surface 7 bears at least in sections on the coating surface 6 of the coating 4, the coating 4 being removable in order to make the further structure 3 movable within an abutment surface defined by the first structure surface 5.

FIG. 7 again shows the first structure 2, the coating 4 and the cured filler 9, which forms the further structure 3.

Figure 7:
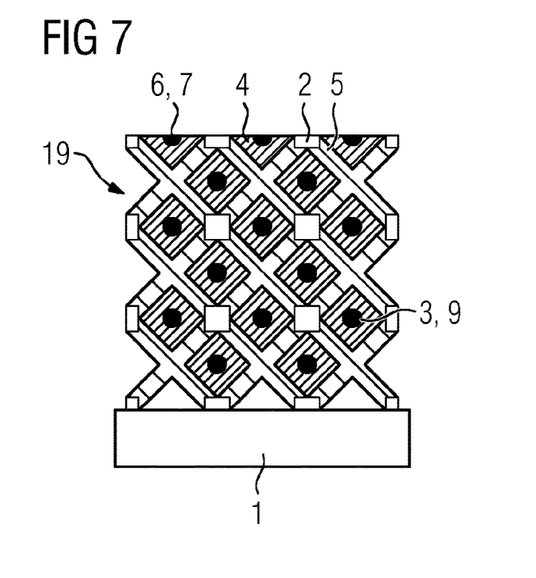
FIG. 7 again shows the method step represented in FIG. 6.

The coating 4 prevents a relative movement of the further structure 3 relative to the first structure 2 and abutment of the further structure 3 on the first structure surface 5. By means of the relative movement of the further structure 3 relative to the first structure 2 and the abutment of the further structure 3 on the first structure surface 5, damping of vibrations of the moved masses 10 is made possible, although this may for example be a hindrance for transport or assembly of the structure combination, for which reason the coating 4 is not removed in a further step until after the transport or assembly. The coating 4 may for example be removed by means of an etching process, heating or another chemical or physical process.

Figure 8:
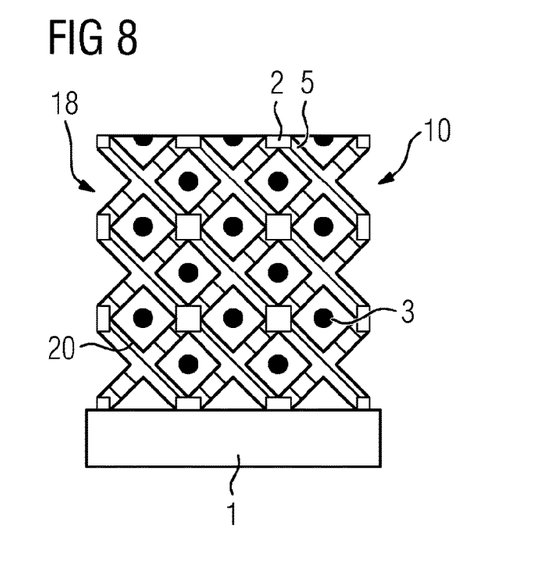
FIG. 8 shows a schematic representation of a further method step for the production of the structure combination.

FIG. 8 shows the structure combination 18 freed of the coating 4. Because the coating 4 has been removed, the further structure 3 is movable relative to the first structure 2 within an abutment surface 20 defined by the first structure surface 5. In the present exemplary embodiment, the abutment surface 20 is configured in such a way that it limits a movement of the further structure 3 in the direction of all spatial axes x, y, z and in direction combinations of all spatial axes. To this end, in the present exemplary embodiment the abutment surface 20 is configured to be bounding on all sides. For example, the abutment surface 20 is configured essentially in the shape of a spherical surface. In this case, the dimensions of the further structure 3 may be greater than the dimensions of the recesses in the respective extent direction.

FIG. 9 again shows the structure combination 18 with the first structure 2 and the further structure 3, the first structure 2 being connected to the base plate 1 and the further structure 3 being interconnected with the first structure 2 but movable within the abutment surface defined by the first structure surface 5.

Figure 9:
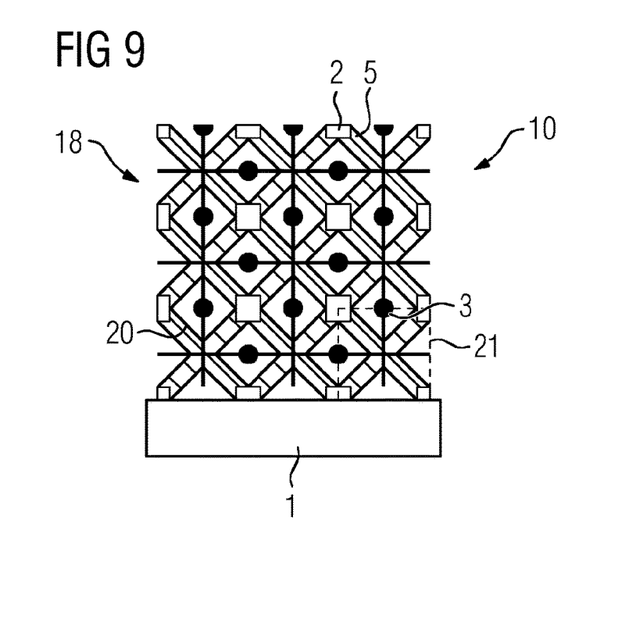
FIG. 9 again shows the method step represented in FIG. 8, but in a different section plane.

Furthermore, with the aid of FIG. 9 it may be seen in particular that the structure combination 18 comprises a structural configuration based on a unit cell 21. In other words, the structure combination 18 comprises a periodically repeating structure in its extent directions.

By the configuration with a multiplicity of unit cells 21, a surface enlargement can be achieved in the region of the abutment surface 20, so that a particularly large contact surface for force transmission is provided when the further structure 3 comes in contact with the first structure 2 during operation.

The base plate 1 and the first structure 2 are configured materially uniformly in the present exemplary embodiment. In other words, the base plate 1 and the first structure 2 are made of the same material or of materials with almost the same material properties. This ensures that no or only minor thermally induced stresses are formed because of heating in the connecting region between the base plate 1 and the first structure 2, since the respective thermal expansion coefficients are of the same value or almost of the same value.

The material of the coating 4 has a melting point and/or evaporation point and/or sublimation point which lies below the respective melting point and/or evaporation point and/or sublimation point and/or an ashing temperature of the material of the base plate 1, of the first structure 2 and of the further structure 3, or of the filler 9.

By virtue of the fact that the further structure 3 is movable within the abutment surface defined by the first structure surface 5, vibrations, which are for example initiated by positive or negative accelerations of the moved first structure 2, can be damped by means of a compensating movement and/or by means of abutment of the further structure surface 7 of the further structure 3 on the abutment surface of the first structure. This increases the lifetime of the turbine blade 11.

Although the invention has been illustrated and described in more detail by preferred exemplary embodiments, the invention is not restricted by the examples disclosed, and other variants may be derived therefrom by the person skilled in the art without departing from the protective scope of the invention.

The invention claimed is:

1. A method for producing a vibration-damping structure combination for damping vibrations for movable masses, having a first structure and a further structure, the further structure being movable within an abutment surface defined by a first structure surface of the first structure, the method comprising:
   a) providing the first structure, which comprises the first structure surface and at least in sections determines a coating surface of a coating, wherein the first structure is at least partially a lattice structure and connected to a blade body along an entire height of the blade body, wherein a cooling fluid is arranged to pass through the lattice structure;
   b) coating the first structure surface of the first structure with the coating, the coating surface of the coating being applied so as to form at least one cavity;
   c) filling the cavity with a filler;
   d) curing the filler until the further structure having a further structure surface, which bears on the coating surface is formed; and
   e) removing the coating so that the further structure is movable relative to the first structure within the abutment surface defined by the first structure surface.

2. The method as claimed in claim 1, wherein the further structure is separable from the first structure without a shape change and/or without structural modification.

3. The method as claimed in claim 1, wherein at least one region of the first structure is formed enclosed by the further structure, and/or at least one region of the further structure is formed enclosed by the first structure, so that the further structure is undetachable from the first structure.

4. The method as claimed in claim 1, wherein the cavity is formed in sections with the coating surface and/or in sections with a surface of an additional molded part.

5. An intermediate product for the production of a vibration-damping structure combination comprising:
   a first structure, which comprises a first structure surface that bears at least in sections on a coating surface of a coating, wherein the first structure is at least partially a lattice structure and connected to a blade body along an entire height of the blade body, wherein a cooling fluid is arranged to pass through the lattice structure, and
   a further structure which comprises a further structure surface and is formed from a cavity filled with a curable filler,
   wherein the further structure surface bears at least in sections on the coating surface of the coating, the coating being removable in order to make the further structure movable within an abutment surface defined by the first structure surface.

6. The intermediate product as claimed in claim 5, wherein the further structure is separable from the first structure without a shape change and/or without structural modification.

7. The intermediate product as claimed in claim 5, wherein the first structure is configured in such a way that it encloses at least a region of the further structure, and/or the further structure is configured in such a way that it encloses at least a region of the first structure, so that the first structure is undetachable from the further structure as soon as the coating is removed.

8. The intermediate product as claimed in claim 5, wherein the cavity filled with the curable filler is formed in sections with the coating surface and/or in sections with a surface of an additional molded part.

9. A structure combination for damping vibrations of movable masses, comprising:
   a first structure which has a particular first inertia and a first structure surface that is configured as an abutment surface, wherein the first structure is at least partially a lattice structure and connected to a blade body along an entire height of the blade body, wherein a cooling fluid is arranged to pass through the lattice structure, and
   a jointly movable further structure which is formed from a cavity filled with a curable filler, the further structure having a particular further inertia and comprising a further structure surface, and the further structure being mobile relative to the first structure within the abutment surface defined by the first structure surface, so that vibrations which may be initiated by positive and/or negative accelerations of the movable masses can be damped by a compensating movement due to the further inertia of the further structure and/or by abutment of the further structure surface of the further structure on the abutment surface of the first structure.

10. The structure combination as claimed in claim 9, wherein the further structure is separable from the first structure without a shape change and/or without structural modification.

11. The structure combination as claimed in claim 9, wherein the first structure is configured in such a way that it encloses at least a region of the further structure, and/or the further structure is configured in such a way that it encloses at least a region of the first structure, so that the first structure is undetachable from the further structure.

12. The structure combination as claimed in claim 9, wherein the cavity filled with the curable filler is formed in sections with a coating surface and/or in sections with a surface of an additional molded part.

\* \* \* \* \*